US011872422B2

(12) United States Patent
Kulanda

(10) Patent No.: US 11,872,422 B2
(45) Date of Patent: Jan. 16, 2024

(54) WILDFIRE SUPPRESSION ASSEMBLY

(71) Applicant: Kathy Kulanda, Grand Rapids, MI (US)

(72) Inventor: Kathy Kulanda, Grand Rapids, MI (US)

( * ) Notice: Subject to any disclaimer, the term of this patent is extended or adjusted under 35 U.S.C. 154(b) by 458 days.

(21) Appl. No.: 17/323,400

(22) Filed: May 18, 2021

(65) Prior Publication Data

US 2022/0370842 A1 Nov. 24, 2022

(51) Int. Cl.

| | |
|---|---|
| ***A62C 3/02*** | (2006.01) |
| ***A62C 31/24*** | (2006.01) |
| ***A62C 35/68*** | (2006.01) |
| ***A62C 37/36*** | (2006.01) |
| ***A62C 37/09*** | (2006.01) |

(52) U.S. Cl.

CPC .......... *A62C 3/0292* (2013.01); *A62C 3/0271* (2013.01); *A62C 35/68* (2013.01); *A62C 37/09* (2013.01); *A62C 37/36* (2013.01)

(58) Field of Classification Search

CPC ..... A62C 3/0292; A62C 3/0271; A62C 37/36; A62C 35/68

See application file for complete search history.

(56) References Cited

U.S. PATENT DOCUMENTS 3,381,922 A * 5/1968 Laing .................... B64C 39/022 244/17.17
3,576,212 A * 4/1971 Siler .................... A62C 3/0214 169/48
3,782,474 A * 1/1974 Wiseman, Jr. ........... A62C 3/00 169/45
3,817,397 A * 6/1974 Wellman ............... B66C 23/305 212/270
4,802,829 A * 2/1989 Miller ................... F04B 17/006 417/120
4,875,526 A * 10/1989 Latino .................. A62C 3/0292 239/289
6,964,379 B2 11/2005 Crowley
7,837,450 B2 11/2010 Moreland
D677,702 S 3/2013 O'Shea
8,418,754 B2 4/2013 Ahern, Jr.
8,534,370 B1 * 9/2013 Al Azemi .............. A62C 31/24 239/281
10,065,059 B2 * 9/2018 Thomsen ............. A62C 3/0271
10,512,804 B2 * 12/2019 Klarlund ................ A62C 31/24
11,040,773 B2 * 6/2021 Furukawa ................. B64F 3/00

(Continued)

FOREIGN PATENT DOCUMENTS

WO WO2004091727 10/2004

*Primary Examiner* — Joseph A Greenlund

(57) ABSTRACT

A wildfire suppression assembly for inhibiting the development of wildfires includes a tower that is located in a remote location and an arm that is pivotally coupled to the tower. A pump is integrated into the tower and the pump is fluidly coupled to a supply pipe to receive water from a below ground water supply. A spray pipe is coupled to the arm and the spray pipe is in fluid communication with the supply pipe to receive the water urged by the pump when the pump is turned on. A spray nozzle is fluidly coupled to the spray pipe to spray the water onto the remote location. In this way the spray nozzle inhibits the development of wildfires by keeping the moisture content of the remote location above a wildfire threshold.

9 Claims, 4 Drawing Sheets

(56) References Cited

U.S. PATENT DOCUMENTS

| | | | | |
|---|---|---|---|---|
| 11,173,329 | B2 * | 11/2021 | Wright | A62C 3/0257 |
| 11,369,817 | B1 * | 6/2022 | Kim | H04N 23/695 |
| 2002/0139543 | A1 * | 10/2002 | Baughman | A62C 5/02 169/14 |
| 2004/0163827 | A1 * | 8/2004 | Privalov | G08B 17/005 239/69 |
| 2009/0151961 | A1 * | 6/2009 | Voorhees | A62C 35/58 169/13 |
| 2010/0236799 | A1 * | 9/2010 | Vetesnik | A62C 5/02 169/70 |
| 2013/0168110 | A1 * | 7/2013 | Baribbi | A62C 31/28 169/25 |
| 2014/0338930 | A1 * | 11/2014 | Smith | A62C 3/0214 169/60 |
| 2015/0129245 | A1 * | 5/2015 | Weber | A62C 3/0271 169/61 |
| 2016/0051848 | A1 * | 2/2016 | Klarlund | A62C 3/0292 169/61 |
| 2016/0051850 | A1 * | 2/2016 | Menard | A62C 3/0214 169/16 |
| 2017/0043872 | A1 * | 2/2017 | Whitaker | B64C 39/024 |
| 2017/0113079 | A1 * | 4/2017 | Thomsen | A62C 3/0292 |
| 2018/0339180 | A1 * | 11/2018 | Weber | G08B 17/005 |
| 2019/0175965 | A1 * | 6/2019 | Huefner | A62C 3/0214 |
| 2019/0290945 | A1 * | 9/2019 | Raymond | A62C 3/0292 |
| 2019/0299038 | A1 * | 10/2019 | Hernandez | B05B 9/007 |
| 2020/0346057 | A1 * | 11/2020 | Westphal | G08B 17/00 |
| 2021/0283439 | A1 * | 9/2021 | Raucher | G06V 20/52 |
| 2022/0176175 | A1 * | 6/2022 | Swart | A62C 3/0292 |
| 2022/0370842 | A1 * | 11/2022 | Kulanda | A62C 35/68 |

* cited by examiner

WILDFIRE SUPPRESSION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to suppression devices and more particularly pertains to a new suppression device for inhibiting the development of wildfires. The device includes a tower that is erected in a remote location and an arm that is pivotally coupled to the tower. A pump is integrated into the tower which is in fluid communication with a below ground water source. A spray nozzle is attached to the arm and the spray nozzle is in fluid communication with the pump for spraying water onto the remote location for reducing the likelihood of a wildfire.

(2) Description of Related Art Including Information Disclosed Under 37 CFR 1.97 and 1.98

The prior art relates to suppression devices including a variety of fire suppression devices that receive water from a below ground water source. The prior art discloses a variety of fire suppression devices that are integrated into an exterior of a building for suppressing fires on or near the building. In no instance does the prior art disclose a fire suppression device that includes a tower positioned in a remote location, an arm pivotally coupled to the tower and a pump for pumping water into the arm for suppressing a wildfire.

BRIEF SUMMARY OF THE INVENTION

An embodiment of the disclosure meets the needs presented above by generally comprising a tower that is located in a remote location and an arm that is pivotally coupled to the tower. A pump is integrated into the tower and the pump is fluidly coupled to a supply pipe to receive water from a below ground water supply. A spray pipe is coupled to the arm and the spray pipe is in fluid communication with the supply pipe to receive the water urged by the pump when the pump is turned on. A spray nozzle is fluidly coupled to the spray pipe to spray the water onto the remote location. In this way the spray nozzle inhibits the development of wildfires by keeping the moisture content of the remote location above a wildfire threshold.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
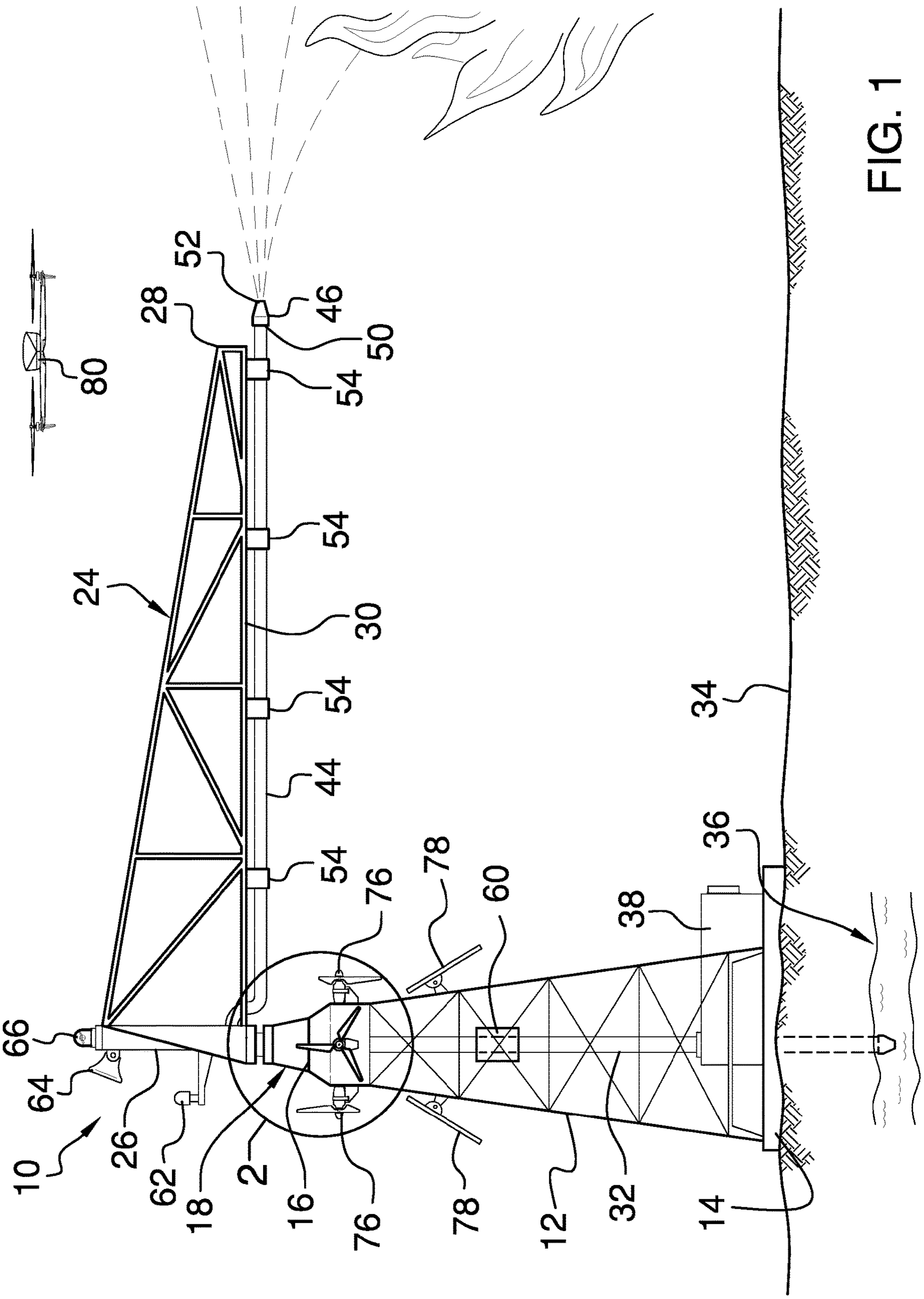
FIG. 1 is a perspective view of a wildfire suppression assembly according to an embodiment of the disclosure.
Figure 2:
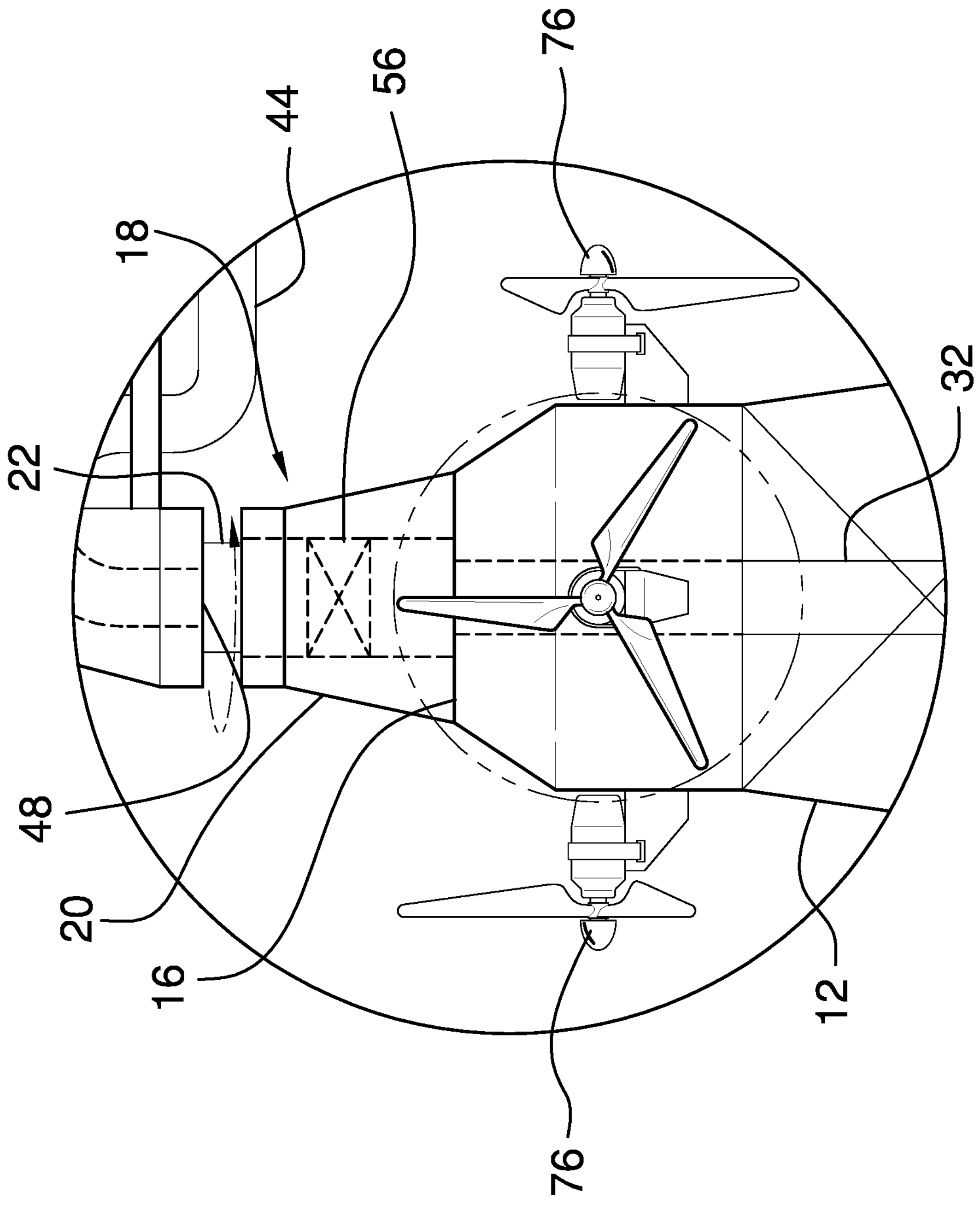
FIG. 2 is a detail view taken from circle 2 of FIG. 1 of an embodiment of the disclosure.
Figure 3:
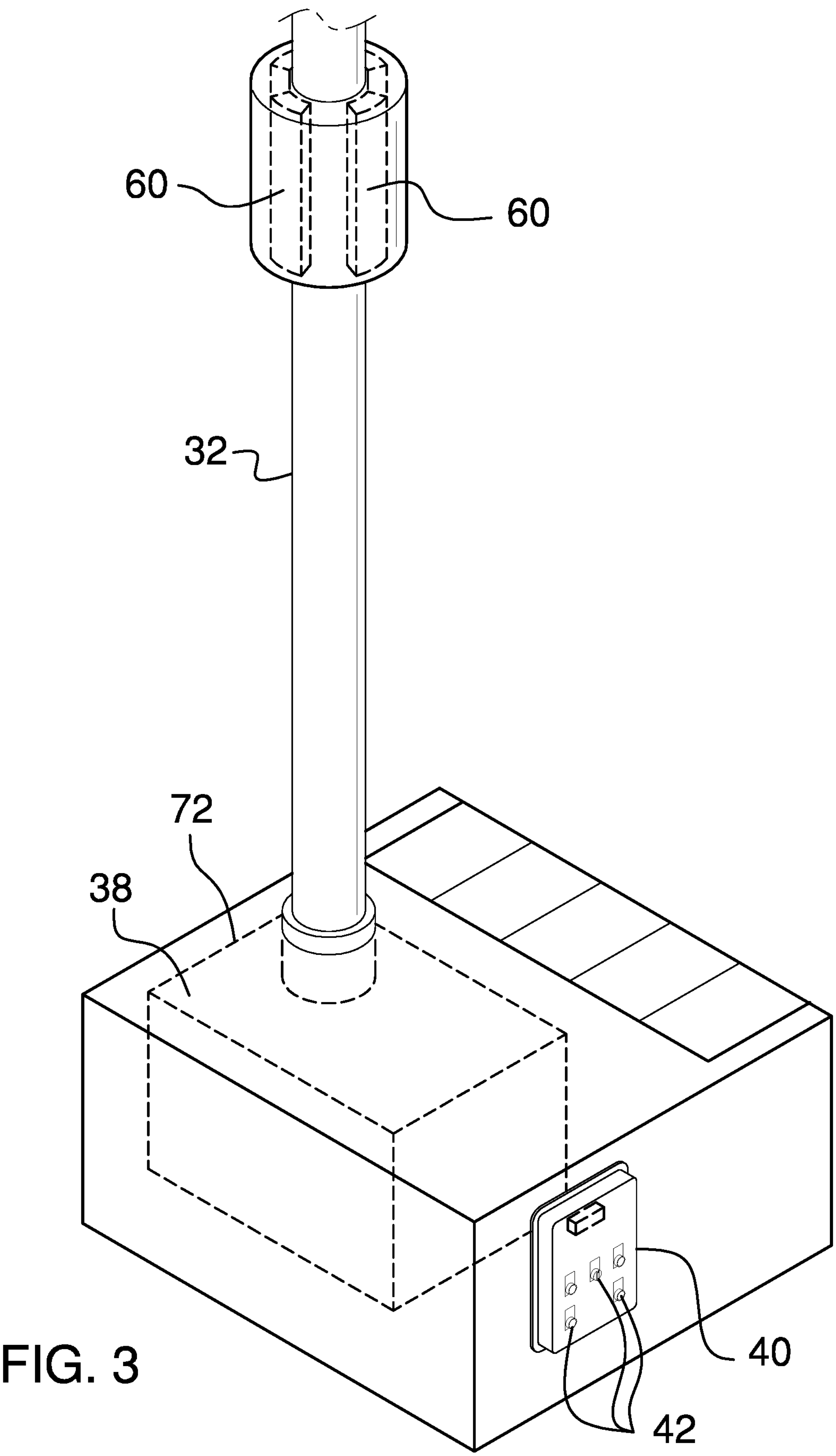
FIG. 3 is a phantom view taken from circle 3 of FIG. 1 of an embodiment of the disclosure.
Figure 4:
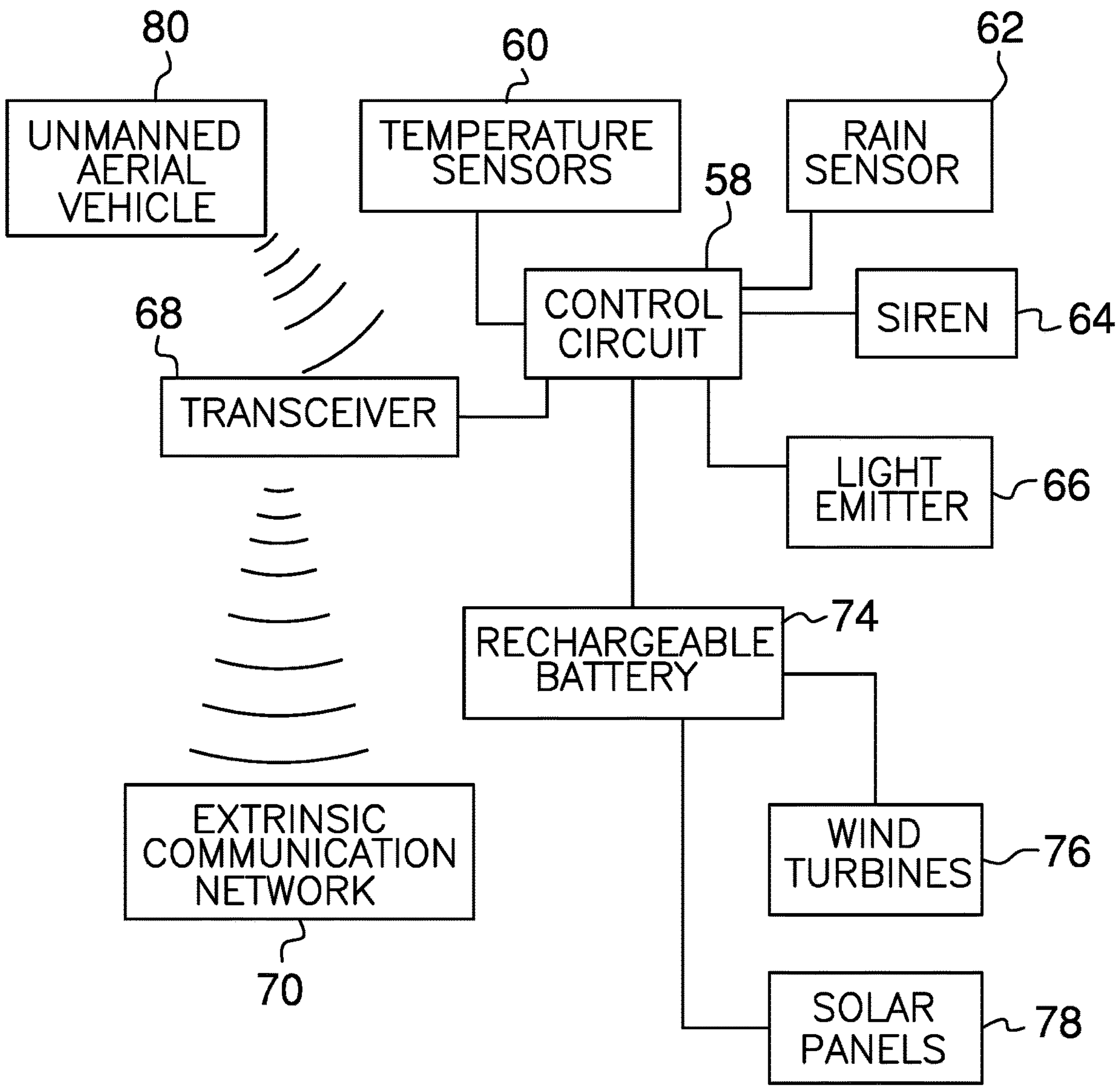
FIG. 4 is a schematic view of an embodiment of the disclosure.

With reference now to the drawings, and in particular to FIGS. 1 through 4 thereof, a new suppression device embodying the principles and concepts of an embodiment of the disclosure and generally designated by the reference numeral 10 will be described.

As best illustrated in FIGS. 1 through 4, the wildfire suppression assembly 10 generally comprises a tower 12 that is located in a remote location. The remote location may be a wilderness area that is prone to wildfires and that is difficult or impossible for emergency responders to access. The tower 12 has a bottom end 14 and a top end 16, and the tower 12 may comprise a lattice structure, a stanchion or any other type of rigid tower 12. A pivot joint 18 is provided that has a lower portion 20 rotatably engaging an upper portion 22, and the lower portion 20 is coupled to the top end 16 of the tower 12. The pivot joint 18 may comprise a pivot joint 18 that is capable of passing a fluid through the upper portion 22 and the lower portion 20, regardless of the position of the lower portion 20 with respect to the upper portion 22.

An arm 24 is pivotally coupled to the tower 12 such that the arm 24 is elevated over the remote location. The arm 24 has a first end 26, a second end 28 and a bottom side 30 extending between the first end 26 and the second end 28. The first end 26 of the arm 24 is coupled to the upper portion 22 of the pivot joint 18 such that the arm 24 is rotatable about an axis extending through the top and the bottom end 14 of the tower 12. The arm 24 is oriented to extend along an axis that is oriented perpendicular to the axis extending through the top end 16 and the bottom end 14 of the tower 12. The arm 24 may comprise a lattice structure, a rigid member or other type of rigid arm 24.

A supply pipe 32 is integrated into the tower 12 and the supply pipe 32 extends downwardly into a support surface 34 upon which the tower 12 is positioned. In this way the supply pipe 32 is in fluid communication with a below ground water supply 36. Moreover, the supply pipe 32 extends upwardly through each of the lower portion 20 and the upper portion 22 of the pivot joint 18. The below ground water supply 36 may be a natural aquifer, a buried water containment tank or any other type of water supply 36.

A pump 38 is integrated into the tower 12 and the pump 38 is fluidly coupled to the supply pipe 32 to receive water from the below ground water supply 36. The pump 38 urges water upwardly through the supply pipe 32 when the pump 38 is turned on. The pump 38 may comprise an electric fluid pump or other type of mechanism is that is capable of pumping the water outwardly from the below ground water supply 36 and upwardly through the supply pipe 32. As is most clearly shown in FIG. 3, a control panel 40 may be coupled to the pump 38 and the control panel 40 may be electrically coupled to the pump 38. The control panels 40 may include switches 42 that manually turning the pump 38 on and off, for automatically turning the pump 38 on and off or controlling other operational parameters of the pump 38.

A spray pipe 44 is coupled to the arm 24 and the spray pipe 44 is in fluid communication with the supply pipe 32. In this way the spray pipe 44 can receive the water urged by the pump 38 when the pump 38 is turned on. The spray pipe 44 has a spray nozzle 46 that is fluidly coupled thereto such that the spray nozzle 46 can spray the water onto the remote location. In this way the spray nozzle 46 can inhibit the development of wildfires by keeping the moisture content of the remote location above a wildfire threshold. Additionally, the spray nozzle 46 can be directed toward a wildfire that is in progress in order to extinguish or reduce the intensity of the wildfire. The spray pipe 44 has a primary end 48 and a secondary end 50, and the primary end 48 is fluidly coupled to the upper portion 22 of the pivot joint 18 such that the primary end 48 is in fluid communication with the supply pipe 32 in the upper portion 22. The pivot joint 18 facilitates the arm 24 to rotate on the tower 12 while maintaining constant fluid communication between the spray pipe 44 and the supply pipe 32.

The spray pipe 44 extends along the bottom side 30 of the arm 24 such that the spray nozzle 46 is positioned adjacent to the second end 28 of the arm 24. The spray nozzle 46 has a distal end 52 with respect to the spray pipe 44, and the distal end 52 is open to spray the water outwardly therefrom. The spray nozzle 46 may comprise a high pressure spray nozzle that is commonly employed on fire extinguishing systems. Additionally, a plurality of supports 54 may be coupled to the bottom side 30 of the arm 24 and the spray pipe 44 might extend through the supports for suspending the spray pipe 44 from the arm 24.

A check valve 56 is provided and the check valve 56 is fluidly integrated into the supply pipe 32. The check valve 56 has a direction of flow in a first direction to facilitate the water to flow from the supply pipe 32 into the spray pipe 44. Additionally, the check valve 56 inhibits a flow in a second direction to inhibit the water from flowing from the spray pipe 44 into the supply pipe 32. The check valve 56 may be a fluid check valve of any conventional design that can inhibit the water from back-flowing from the spray pipe 44 to the supply pipe 32.

A control circuit 58 is integrated into the pump 38, and the control circuit 58 receives a rain input and a fire input. The control circuit 58 is electrically coupled to the pump 38 and the pump 38 is turned on when the control circuit 58 receives either of the rain input or the fire input. A plurality of temperature sensors 60 is each coupled to the supply pipe 32. Each of the temperature sensors 60 is in thermal communication with ambient air thereby facilitating the plurality of temperature sensors 60 to measure the temperature of the ambient air and each of the temperature sensors 60 is electrically coupled to the control circuit 58. Moreover, the control circuit 58 receives the fire input when the plurality of temperature sensors 60 senses a temperature that exceeds a pre-determined trigger temperature which correlates to an existing wildfire or an ambient temperature that correlates to a high risk of wildfires. Each of the temperature sensors 60 may comprise an electronic temperature sensor or the like. Additionally, as is most clearly shown in FIG. 3, the temperature sensors 60 may be spaced apart from each other and be distributed around the supply pipe 32.

A rain sensor 62 is coupled to the arm 24 for sensing rain and the rain sensor 62 is electrically coupled to the control circuit 58. The control circuit 58 receives the rain input when the rain sensor 62 fails to sense rain over a pre-determined duration of time. The pre-determined duration of time may be a duration of time defined by fire control authorities that correlates to a high level risk of wildfires. A siren 64 is coupled to the arm 24 to emit an audible alarm 24 when the siren 64 is turned on and the siren 64 is electrically coupled to the control circuit 58. The siren 64 is turned on when the control circuit 58 receives the fire input to audibly alert bystanders that a wildfire is imminent. The siren 64 may be an electronic siren that has a volume level of at least 100.0 dB such that the siren 64 is clearly audible to the bystanders.

A light emitter 66 is provided and the light emitter 66 is coupled to the arm 24 to emit light outwardly therefrom. The light emitter 66 is electrically coupled to the control circuit 58 and the light emitter 66 is turned on when the control circuit 58 receives the fire input. In this way the light emitter 66 can visually alert bystanders that a wildfire is imminent. The light emitter 66 may comprise a light emitting diode strobe or other type of electronic light emitter.

A transceiver 68 is integrated into the pump 38 and the transceiver 68 is electrically coupled to the control circuit 58. The transceiver 68 is in wireless communication with an extrinsic communication network 70. Additionally, the transceiver 68 may comprise a radio frequency transmitter and the transmitter may employ a WPAN signal. The extrinsic communication network 70 may comprise a cellular phone network, the internet or any other wireless communication network.

A power supply 72 is integrated into the pump 38 and the power supply 72 is electrically coupled to the control circuit 58. The power supply 72 comprises a rechargeable battery 74 that is integrated into the pump 38 and the rechargeable battery 74 is electrically coupled to the pump 38. The power supply 72 includes a plurality of wind turbines 76 that is each coupled to the tower 12 such that each of the wind turbines 76 can be rotated by wind. Each of the wind turbines 76 is electrically coupled to the rechargeable battery 74 for charging the rechargeable battery 74. The power supply 72 includes a plurality of solar panels 78 and each of the solar panels 78 is coupled to the tower 12 such that each of the solar panels 78 is exposed to sunlight. Each of the solar panels 78 is electrically coupled to the rechargeable battery 74 for charging the rechargeable battery.

An unmanned aerial vehicle 80 is provided and the unmanned aerial vehicle 80 can fly in a location proximate the tower 12 thereby facilitating the unmanned aerial vehicle 80 to surveil the location proximate the tower 12. The unmanned aerial vehicle 80 might include video cameras that are capable of capturing video imagery or the location proximate the tower 12. Additionally, the unmanned aerial vehicle 80 is in wireless communication with the transceiver 68 to broadcast surveillance information to a remote data server that is in communication with the extrinsic communication network 70. In this way emergency responders, such as a fire department or the like, can monitor the location proximate the tower 12.

In use, the pump 38 is turned on when the rain sensor 62 fails to sense rain after a pre-determined duration of time has passed without rain fall. In this way the spray nozzle 46 sprays the water to increase the moisture level of the remote area in order to reduce the likelihood of a wildfire. Additionally, the pump 38 is turned on when the temperature sensors 60 senses a temperature that exceeds the pre-determined threshold temperature. In this way a wildfire that is in progress can be extinguished or reduced in intensity thereby reducing the likelihood that the wildfire will burn out of control and threaten lives and property that are located near the remote location. The unmanned aerial vehicle 80 can be remotely controlled for surveilling the remote location either before or after the pump 38 is turned on.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wildfire suppression assembly for inhibiting the development of wildfires in remote locations, said assembly comprising:

a tower being located in a remote location;

an arm being pivotally coupled to said tower such that said arm is elevated over the remote location;

a supply pipe being integrated into said tower, said supply pipe extending downwardly into a support surface upon which said tower is positioned wherein said supply pipe is configured to be in fluid communication with a below ground water supply;

a pump being integrated into said tower, said pump being fluidly coupled to said supply pipe wherein said pump is configured to receive water from the below ground water supply, said pump urging water upwardly through said supply pipe when said pump is turned on; and a spray pipe being coupled to said arm, said spray pipe being in fluid communication with said supply pipe wherein said spray pipe is configured to receive the water urged by said pump when said pump is turned on, said spray pipe having a spray nozzle being fluidly coupled thereto wherein said spray nozzle is configured to spray the water onto the remote location for inhibiting the development of wildfires by keeping the moisture content of the remote location above a wildfire threshold.

2. The assembly according to claim 1, wherein:

said tower has a bottom end and a top end;

said assembly includes a pivot joint having a lower portion rotatably engaging an upper portion, said lower portion being coupled to said top end of said tower;

said arm has a first end, a second end and a bottom side extending between said first end and said second end, said first end of said arm being coupled to said upper portion of said pivot joint such that said arm is rotatable about an axis extending through said top and said bottom end of said tower, said arm being oriented to extend along an axis being oriented perpendicular to said axis extending through said top end and said bottom end of said tower.

3. The assembly according to claim 2, wherein:

said supply pipe extends upwardly through each of said lower portion and said upper portion of said pivot joint; and said spray pipe has a primary end and a secondary end, said primary end being fluidly coupled to said upper portion of said pivot joint such that said primary end is in fluid communication with said supply pipe in said upper portion, said spray pipe extending along said bottom side of said arm such that said spray nozzle is positioned adjacent to said second end of said arm, said spray nozzle having a distal end with respect to said spray pipe, said distal end being open wherein said distal end is configured to spray the water outwardly therefrom; and said assembly includes a check valve being fluidly integrated into said supply pipe, said check valve having a direction of flow in a first direction wherein said check valve is configured to facilitate the water to flow from said supply pipe into said spray pipe, said check valve inhibiting a flow in a second direction wherein said check valve is configured to inhibit the water from flowing from said spray pipe into said supply pipe.

4. The assembly according to claim 1, further comprising:

a control circuit being integrated into said pump, said control circuit receiving a rain input, said control circuit receiving a fire input, said control circuit being electrically coupled to said pump, said pump being turned on when said control circuit receives either of said rain input or said fire input;

a plurality of temperature sensors, each of said temperature sensors being coupled to said supply pipe, each of said temperature sensors being in thermal communication with ambient air wherein said plurality of temperature sensors is configured to measure the temperature of the ambient air, each of said temperature sensors being electrically coupled to said control circuit, said control circuit receiving said fire input when said plurality of temperature sensors senses a temperature that exceeds a pre-determined trigger temperature; and a rain sensor being coupled to said arm wherein said rain sensor is configured to sense rain, said rain sensor being electrically coupled to said control circuit, said control circuit receiving said rain input when said rain sensor fails to sense rain over a pre-determined duration of time.

5. The assembly according to claim 4, further comprising a siren being coupled to said arm wherein said siren is configured to emit an audible alarm when said siren is turned on, said siren being electrically coupled to said control circuit, said siren being turned on when said control circuit receives said fire input wherein said siren is configured to alert bystanders that a wildfire is imminent.

6. The assembly according to claim 4, further comprising a light emitter being coupled to said arm wherein said light emitter is configured to emit light outwardly therefrom, said light emitter being electrically coupled to said control circuit, said light emitter being turned on when said control circuit receives said fire input wherein said light emitter is configured to visually alert bystanders that a wildfire is imminent.

7. The assembly according to claim 4, further comprising a power supply being integrated into said pump, said power supply being electrically coupled to said control circuit, said power supply comprising:

a rechargeable battery being integrated into said pump, said rechargeable battery being electrically coupled to said pump;

a plurality of wind turbines, each of said wind turbines being coupled to said tower wherein each of said wind turbines is configured to be rotated by wind, each of said wind turbines being electrically coupled to said rechargeable battery for charging said rechargeable battery; and a plurality of solar panels, each of said solar panels being coupled to said tower wherein each of said solar panels is configured to be exposed to sunlight, each of said solar panels being electrically coupled to said rechargeable battery for charging said rechargeable battery.

8. The assembly according to claim 4, further comprising:

a transceiver being integrated into said pump, said transceiver being electrically coupled to said control circuit, said transceiver being in wireless communication with an extrinsic communication network; and an unmanned aerial vehicle being configured to fly in a location proximate said tower thereby facilitating said unmanned aerial vehicle to surveil the location proximate said tower, said unmanned aerial vehicle being in wireless communication with said transceiver wherein said unmanned aerial vehicle is configured to broadcast surveillance information to a remote data server that is in communication with the extrinsic communication network thereby facilitating emergency responders to monitor the location proximate said tower.

9. A wildfire suppression assembly for inhibiting the development of wildfires in remote locations, said assembly comprising:

a tower being located in a remote location, said tower having a bottom end and a top end;

a pivot joint having a lower portion rotatably engaging an upper portion, said lower portion being coupled to said top end of said tower;

an arm being pivotally coupled to said tower such that said arm is elevated over the remote location, said arm having a first end, a second end and a bottom side extending between said first end and said second end, said first end of said arm being coupled to said upper portion of said pivot joint such that said arm is rotatable about an axis extending through said top and said bottom end of said tower, said arm being oriented to extend along an axis being oriented perpendicular to said axis extending through said top end and said bottom end of said tower;

a supply pipe being integrated into said tower, said supply pipe extending downwardly into a support surface upon which said tower is positioned wherein said supply pipe is configured to be in fluid communication with a below ground water supply, said supply pipe extending upwardly through each of said lower portion and said upper portion of said pivot joint;

a pump being integrated into said tower, said pump being fluidly coupled to said supply pipe wherein said pump is configured to receive water from the below ground water supply, said pump urging water upwardly through said supply pipe when said pump is turned on;

a spray pipe being coupled to said arm, said spray pipe being in fluid communication with said supply pipe wherein said spray pipe is configured to receive the water urged by said pump when said pump is turned on, said spray pipe having a spray nozzle being fluidly coupled thereto wherein said spray nozzle is configured to spray the water onto the remote location for inhibiting the development of wildfires by keeping the moisture content of the remote location above a wildfire threshold, said spray pipe having a primary end and a secondary end, said primary end being fluidly coupled to said upper portion of said pivot joint such that said primary end is in fluid communication with said supply pipe in said upper portion, said spray pipe extending along said bottom side of said arm such that said spray nozzle is positioned adjacent to said second end of said arm, said spray nozzle having a distal end with respect to said spray pipe, said distal end being open wherein said distal end is configured to spray the water outwardly therefrom;

a check valve being fluidly integrated into said supply pipe, said check valve having a direction of flow in a first direction wherein said check valve is configured to facilitate the water to flow from said supply pipe into said spray pipe, said check valve inhibiting a flow in a second direction wherein said check valve is configured to inhibit the water from flowing from said spray pipe into said supply pipe;

a control circuit being integrated into said pump, said control circuit receiving a rain input, said control circuit receiving a fire input, said control circuit being electrically coupled to said pump, said pump being turned on when said control circuit receives either of said rain input or said fire input;

a plurality of temperature sensors, each of said temperature sensors being coupled to said supply pipe, each of said temperature sensors being in thermal communication with ambient air wherein said plurality of temperature sensors is configured to measure the temperature of the ambient air, each of said temperature sensors being electrically coupled to said control circuit, said control circuit receiving said fire input when said plurality of temperature sensors senses a temperature that exceeds a pre-determined trigger temperature;

a rain sensor being coupled to said arm wherein said rain sensor is configured to sense rain, said rain sensor being electrically coupled to said control circuit, said control circuit receiving said rain input when said rain sensor fails to sense rain over a pre-determined duration of time;

a siren being coupled to said arm wherein said siren is configured to emit an audible alarm when said siren is turned on, said siren being electrically coupled to said control circuit, said siren being turned on when said control circuit receives said fire input wherein said siren is configured to alert bystanders that a wildfire is imminent;

a light emitter being coupled to said arm wherein said light emitter is configured to emit light outwardly therefrom, said light emitter being electrically coupled to said control circuit, said light emitter being turned on when said control circuit receives said fire input wherein said light emitter is configured to visually alert bystanders that a wildfire is imminent;

a transceiver being integrated into said pump, said transceiver being electrically coupled to said control circuit, said transceiver being in wireless communication with an extrinsic communication network;

a power supply being integrated into said pump, said power supply being electrically coupled to said control circuit, said power supply comprising:

a rechargeable battery being integrated into said pump, said rechargeable battery being electrically coupled to said pump;

a plurality of wind turbines, each of said wind turbines being coupled to said tower wherein each of said wind turbines is configured to be rotated by wind, each of said wind turbines being electrically coupled to said rechargeable battery for charging said rechargeable battery; and a plurality of solar panels, each of said solar panels being coupled to said tower wherein each of said solar panels is configured to be exposed to sunlight, each of said solar panels being electrically coupled to said rechargeable battery for charging said rechargeable battery; and an unmanned aerial vehicle being configured to fly in a location proximate said tower thereby facilitating said unmanned aerial vehicle to surveil the location proximate said tower, said unmanned aerial vehicle being in wireless communication with said transceiver wherein said unmanned aerial vehicle is configured to broadcast surveillance information to a remote data server that is in communication with the extrinsic communication network thereby facilitating emergency responders to monitor the location proximate said tower.

* * * * *